Nov. 15, 1960 W. KOPP ET AL 2,960,017
CAMERAS
Filed July 5, 1957 12 Sheets-Sheet 1

INVENTORS.
Wilhelm Kopp and
Hans Hell
BY: Michael S. Striker

INVENTORS
Wilhelm Kopp and
Hans Hell
By: Michael A. Striker
agt.

CAMERAS

Wilhelm Kopp, Wiesbaden-Sonnenberg, and Hans Hell, Wiesbaden-Freudenberg, Germany, assignors to Adox Kamerawerk G.m.b.H., Wiesbaden-Biebrich, Germany Filed July 5, 1957, Ser. No. 670,223

Claims priority, application Germany July 7, 1956

4 Claims. (Cl. 95—31)

The present invention relates to cameras and in particular to still cameras capable of having magazines inserted into and removed from the housing thereof.

For example, such a camera may have as part of its housing a turnable rear wall movable between an open and closed position, and when this housing is closed by the rear wall the latter urges a spring against a magazine in the housing which in turn is urged against a front wall of the housing in the direction of the optical axis of the camera.

One of the objects of the present invention is to provide a reliable relatively simple construction for a camera of the above type which will prevent errors in the operation of the camera by preventing opening of the camera if film in a magazine in the camera is not moved through an entire film frame and exposed and which will also prevent actuation of a film transporting means of the camera if the rear wall of the camera is in its open position.

A further object of the present invention is to provide a camera of the above type which will permit the magazine to be changed and the rear wall of the camera to be moved to its open position only when the shutter is not cocked, which is to say when the last unexposed film frame which was moved into its picture-taking position was exposed.

Also, it is an object of the present invention to provide a camera which will permit cocking and release of a shutter of the camera only when a magazine is in the camera and a complete film frame is in a picture-taking position.

An additional object of the present invention is to provide a camera of the above type which will reliably prevent double exposures even when the magazine is changed.

Still another object of the present invention is to provide a camera of the above type which will prevent operation of a locking means for the rear wall of the camera unless this rear wall is in its closed position.

A still further object of the present invention is to provide in a camera of the above type a means which will reliably prevent the rear wall of the camera from springing suddenly to its open position upon actuation of the lock means so as to release the rear wall. It is one of the objects of the invention to require the operator to gradually release the rear wall of the camera rather than to permit this rear wall to suddenly move to its open position.

A still additional object of the present invention is to provide a camera of the above type with a single manually operable lever which is capable of bringing about the transportation of the film as well as the cocking of the shutter of the camera. Furthermore it is an object of the invention to provide an arrangement where such a lever is at all times capable of automatically returning to a starting position even if the operator has already moved this lever away from its starting position. The objects of the present invention include locking of the camera against opening as well as against actuation of film transporting structure until complete actuation of this operating lever even though it has been partly actuated and returned to its starting position, and furthermore it is an object of the present invention to provide a structure which will prevent release of the shutter until this operating lever has returned to its starting position.

The objects of the present invention also include an arrangement which will guarantee that the film is moved by the film transporting means through a distance equal to only one film frame irrespective of how many times a manually operable lever for actuating the film transporting means is actuated without being moved through its complete stroke, and furthermore it is within the objects of the invention to prevent actuation of the shutter until a complete unexposed film frame is located in its picture-taking position. Furthermore, it is an object of the invention to prevent actuation of this operating lever a second time immediately after it has been once actuated through its entire stroke until after a film frame which has been moved to a picture-taking position has been exposed.

With the above objects in view, the present invention mainly consists of a camera which includes a means for preventing opening of the camera housing while a film transporting means of the camera is being actuated and a means for preventing operation of the film transporting means while structure for opening and closing the camera housing is being actuated. The camera housing rotatably supports a pair of discs for turning movement about a pair of parallel axes, respectively, and these discs respectively form parts of the film transporting means and the means for releasably locking a wall of the camera housing. The discs are located beside each other substantially in a common plane and their peripheries are located next to each other. These peripheries are respectively formed with cutouts and the discs have starting positions where these cutouts are directed toward each other. From this starting position of the discs either of the discs may be turned so that its periphery moves through the cutout of the other disc, and after any one of these two discs has been turned from its starting position the other disc cannot be turned.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 5:
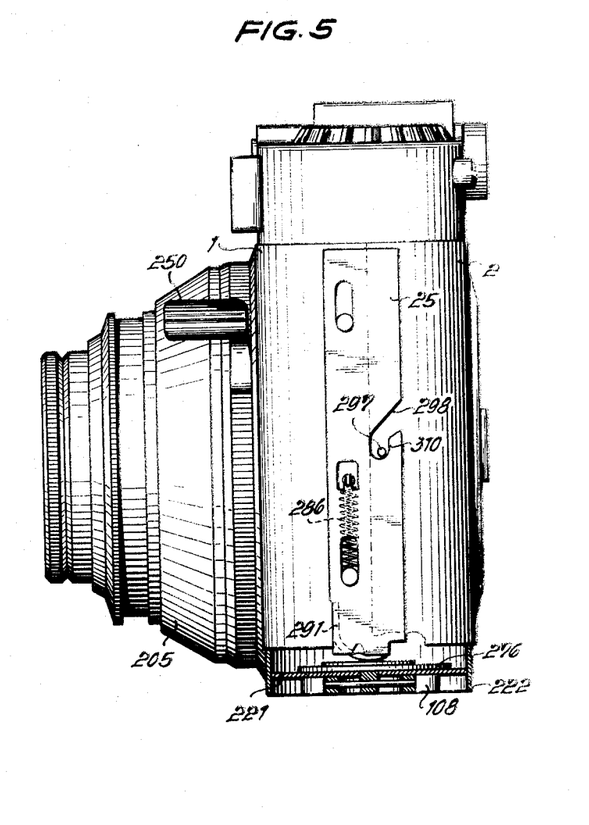
Fig. 5 is an end elevational view of a camera according to the present invention as seen in the direction of the arrow C of Fig. 1.
Figure 14:
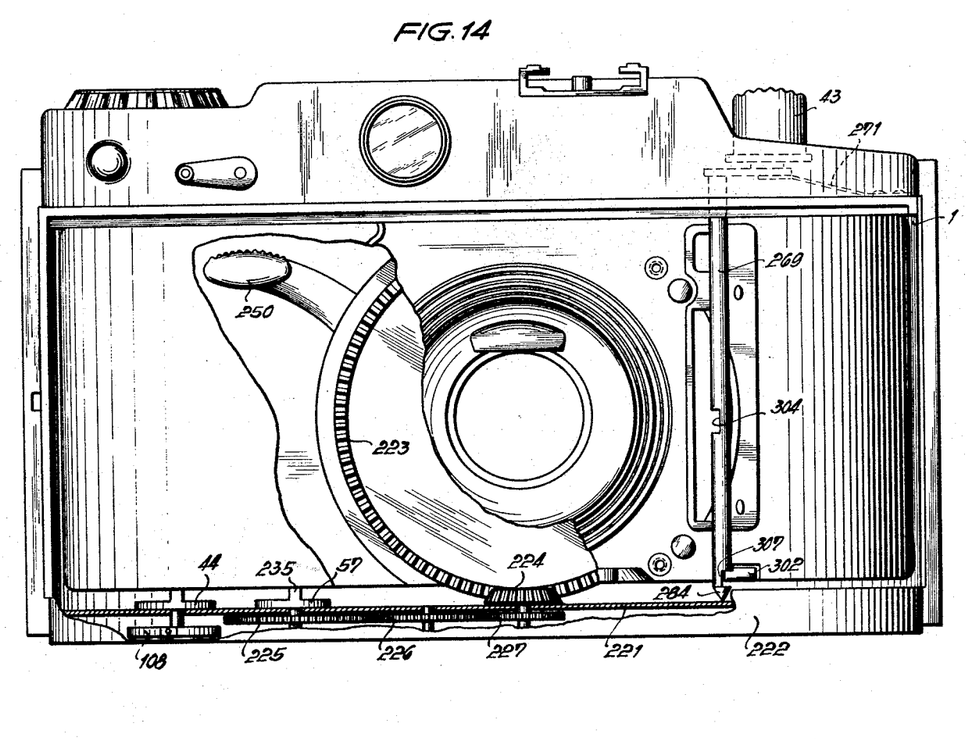
Fig. 14 is a diagrammatic illustration of the camera seen from the rear with the rear wall removed and part of the front wall removed, Fig. 14 showing the film transporting structure as well as the shutter releasing structure.

Referring first to Fig. 5 of the drawings, the camera of the invention includes a housing 1, and part of this housing is formed by a rear wall 2 of the camera which is turnable between a closed position illustrated in Fig. 5 and an open position where the rear wall 2 turns about a hinge connected to the end of the camera which is not visible in Fig. 5, so that when the rear wall 2 is turned to its open position the end of the rear wall 2 which is shown in Fig. 5 turns to the right, as viewed in Fig. 5. The stationary part of the camera housing supports an elongated lock member 25 for vertical shifting movement, as viewed in Fig. 5, and Fig. 5 shows an elongated slot formed at the top end of the lock member 25 and receiving a pin fixed to the camera housing 1, this pin cooperating with the slot to guide the lock member 25 for vertical shifting movement as well as to limit the extent of this shifting movement. A similar pin and slot located near the bottom end of the lock member 25, as is clearly shown in Fig. 5, and the lower pin has connected thereto a spring 286 which is fixed at its upper end to a projection of the lock member 25, so that this spring 286 urges the lock member 25 downwardly toward a position where it will unlock the rear wall 2. This rear wall 2 carries a pin 297 which extends into a cutout of the lock member 25, and this cutout is defined in part by an inclined edge 298 and by a hook-shaped portion 310. At its bottom end the lock member 25 is provided with an extension 291 having a curved portion 281 as will be described in greater detail below. The bottom end of the camera housing is closed by a cap member 222 shown in Fig. 5 and a manually operable lock actuating member 108 is accessible at the bottom part of the camera for actuating the structure which releasably locks the wall 2 of the camera in its closed position. The rear wall 2 of the camera is turned to its open position in order to permit a magazine to be removed from the interior of the camera and in order to permit a fresh magazine to be placed in the camera. As is shown diagrammatically in Fig. 14, the manually operable key 108 cooperates with a clutch 44 in the interior of the camera so that through the clutch 44 turning movement of the key 108 may be transmitted. Through this clutch 44 the turning of the key 108 will cause a screen of a magazine to move in such a way that when the key 108 is actuated to lock the rear wall 2 of the camera in its closed position the screen will be moved to open an exposure aperture of the magazine while when the key is turned so as to release the rear wall 2 for movement to its open position the screen will be moved so as to close the exposure aperture of the magazine.

As is shown particularly in Figs. 15–18, the camera includes a manually operable lever 250 which forms part of a turntable ring means which causes a gear sector 223 to cooperate with a bevel gear 224 for actuating a film transporting means which includes the train of gears 225–227. This train of gears cooperates through a clutch 57 with a structure within the magazine for transporting film therein, and furthermore the turning of the lever 250 causes the shutter of the camera to be cocked in the manner described below.

According to the present invention the film transporting means cannot be actuated unless the rear wall of the camera is in its closed position and the camera cannot be opened while the film transporting means is being actuated. As may be seen from Figs. 1–7 a disc 276 forms part of the structure of the camera of the invention, and this disc 276 is connected to the key 108 for turning movement therewith. This disc 276 cooperates with the shiftable lock member 25 as well as with the film transporting means and with a double exposure preventing device in a manner described below. The extension 291 of the lock member 25 is shown most clearly in Figs. 6 and 7, and as is apparent from Figs. 9 and 8 a part of the extension 291 is curved as indicated at 281, the curvature of the portion 281 of the extension 291 being about an axis substantially normal to the turning axis of the disc 276.

Figures 6, 7, 8, 9:
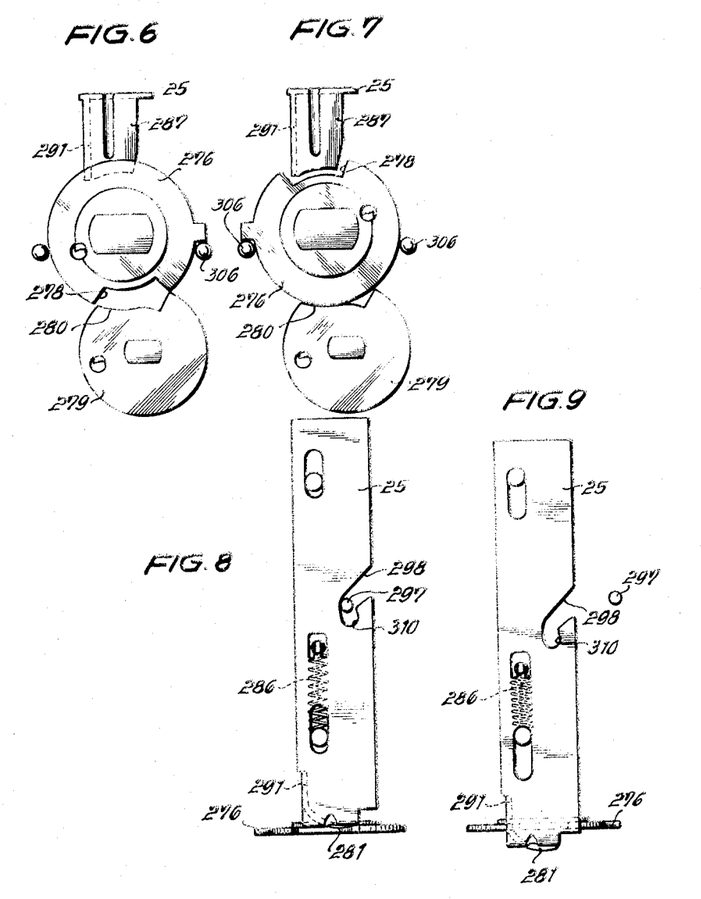
Fig. 6 diagrammatically illustrates the locking structure of the invention in its locked position.
Fig. 7 diagrammatically illustrates the position which the parts of Fig. 6 take when the locking means is in its unlocking position.
Fig. 8 is an elevational view of a longitudinally shiftable locking member shown in a position which it takes during locking of the camera housing.
Fig. 9 diagrammatically illustrates the position which the locking member of Fig. 8 takes when the camera housing is unlocked.

In order to open the camera the key 108 is actuated so as to turn the disc 276 from the position of Fig. 6 to that of Fig. 7, and it will be noted that in this position the extension 291 of the lock member 25 becomes aligned with a cutout 278 which is formed in the periphery of the disc 276. While the lock means holds the cover 2 in the closed position thereof shown in Fig. 5 the spring 286 urges the bottom face of the extension 291 downwardly against the disc 276, as is shown most clearly in Fig. 5. Thus, when the key 108 is turned so as to locate the cutout 278 of the disc 276 in alignment with the extension 291, the spring 286 is capable of shifting the lock member 25 automatically downwardly so that the extension 291 enters into the cutout 278. As was mentioned above, the rear wall 2 of the camera normally has a spring which urges the magazine forwardly along the optical axis, and if the lock means suddenly freed the rear wall 2 the latter might spring open in an undesirable manner. The hook-shaped portion 310 of the cutout of the lock member 25 prevents the latter from being moved downwardly beyond a point where the hook portion 310 engages the pin 297 which is fixed to the rear cover 2. Thus, the rear wall 2 cannot spring open in an undesirable manner. It is necessary for the operator to press this rear wall 2 forward slightly so as to permit the spring 286 to continue the downward movement of the lock member 25, and thereafter the rear wall 2 is released for movement to its open position, as is indicated diagrammatically by the position of pin 297 in Fig. 9 with respect to the lock member 25. It will be noted that when the lock member 25 is in its open position shown in Fig. 9 a part of the extension 291 is still located in the cutout 278 of the disc 276 so that the latter cannot turn, and thus while the cover is away from its closing position the key 108 cannot be actuated to move the lock means.

When a new magazine, for example, has been placed within the camera housing, the rear wall 2 thereof is moved to its closed position, and during such movement the pin 297 engages the inclined edge 298 of the cutout of the member 25 so as to automatically raise the latter during such closing movement of the rear wall 2 of the camera. It will be noted, however, from Fig. 8, that the cooperation of the pin 297 with the inclined edge 298 raises the lock member 25 to a distance which still maintains the lower curved portion 281 of the extension 291 at the elevation of the disc 276. Thus, while the parts are in the position shown in Fig. 8 it is necessary for the operator to turn the disc 276 so that it rides beneath the curved portion 281 of the extension 291 to further raise the lock member 25 to the position indicated in Fig. 5, and now the camera is securely closed. As is indicated in Figs. 6 and 7, the housing of the camera carries a pair of stop pins 306 which cooperate with a radial projection of the disc 276 so as to limit the latter to turning movement of substantially 180° back and forth between the position of Fig. 6 and that of Fig. 7.

The structure of the camera of the invention includes a second disc 279 which is connected to the gear 225 of the film transporting means for turning movement with this gear. This disc 279 is turnable about an axis parallel to the turning axis of the disc 276, and it will be noted particularly from Figs. 1–4, 6, and 7 that the discs 276 and 279 are located beside each other in a common plane with their peripheries located directly next to each other. The disc 279 is formed with a cutout 280 which is directed toward the cutout 278 in the starting position of both of the discs illustrated in Figs. 1 and 6. The size of the cutouts 278 and 280 is such that when the disc 279 is in its starting position the disc 276 may be turned from the position of Fig. 6 to that of Fig. 7 and back again, and it will be noted that during this turning movement the periphery of the disc 276 extends through the cutout 280 of the disc 279 so that the disc 279 cannot turn even after the disc 276 has been moved through a relatively short distance beyond its starting position shown in Figs. 1 and 6. Thus, this turning of the disc 276 will prevent actuation of the film transporting means. On the other hand, it is also possible for the discs 279 to turn with its periphery through the cutout 278 of the disc 276, as is indicated in Fig. 3, and thus even after the film transporting means has started to operate even through a slight distance it is not possible to actuate the lock means because the disc 276 cannot turn at this time, as is readily apparent from Fig. 3.

The discs 276 and 279 are arranged beneath the bottom wall 221 of the camera housing, while the film transporting gears 225—227 are arranged above this bottom wall. Also arranged beneath the bottom wall 221 is an elongated catch member 277 which is supported by any suitable straps or the like for shifting and turning movement and which among other functions perform the function of preventing double exposures. The elongated catch member 277 is formed with an elongated slot 282 intermediate its ends, and a stationary pin of the camera housing extends through the slot so that in this way the member 277 is guided for longitudinal shifting movement as well as for pivotal turning movement. The left end of the catch member 277, as viewed in Figs. 1–4, adjustably carries a plate 285, so that this plate may have its position with respect to the member 277 adjusted. This catch member 277 includes adjacent its right end a projection 301 which cooperates with a tooth 300 of a toothed member 295 turnable with the disc 279. As a result of the pawl and ratchet mechanism shown in Figs. 1–4, the disc 279 can turn only in a counterclockwise direction, as viewed in Figs. 1–4, and thus with the catch member 277 in the position shown in Fig. 1 the disc 279 as well as the remainder of the film transporting structure cannot be actuated because the tooth 300 abuts against the projection 301 of the catch member 277.

Figure 1:
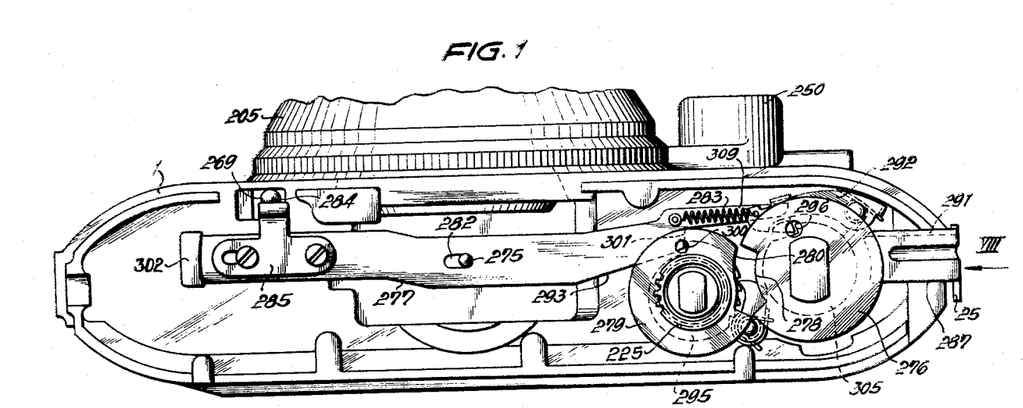
Fig. 1 is a partly diagrammatic view of a camera according to the present invention as seen from below with the lowermost part of a cap which closes the bottom of the camera being removed.

The right free end of the catch member 277, as viewed in Figs. 1–4, extends beneath, or actually above since Figs. 1–4 are views from underneath, a lever 292 which is turnably carried by the camera housing adjacent its right end, as viewed in Figs. 1–4, and this lever 292 is urged by a wire spring in a direction which causes a projection of the lever or catch member 292 to engage a tooth 296 of another toothed member which is fixed to the disc 276 for turning movement therewith. It will be noted that in the position of the parts shown in Fig. 1 the projection of the catch member 292 engages the tooth 296 of the toothed member 305 so that the disc 276 cannot be turned in a counterclockwise direction from the position thereof shown in Fig. 1, and this disc 276 must be turned in this direction in order to unlock the rear wall of the camera. A spring 283 is fixed at one end to the catch member 292 and at its other end to the catch member 277, and this spring together with the pivotal mountings of these two catch members urges the projections of the catch members respectively toward the toothed members 295 and 305. Furthermore, the catch member 292 has along one of its edges an extension engaged by the upper free edge of the catch member 277, as viewed in Fig. 1, so that when this catch member 277 turns in a counterclockwise direction about the pivot pin 275 of Fig. 1 the catch member 277 causes the catch member 292 to turn away from the tooth member 305. Thus, a means is provided for interconnecting the two catch members so that they will move together between their positions engaging the toothed members to prevent turning of the discs 279 and 276 and release positions releasing these discs for turning movement. In the position of the parts which is illustrated in Fig. 1 the catch members 277 and 292 are in a position where they prevent turning of the discs 279 and 276, and thus in this position of the parts the film transporting means cannot be actuated and the camera cannot be opened. This is the position which the parts take after an unexposed film frame has been moved into a picture-taking position.

At this time it is only possible to release the shutter of the camera, and the shutter release includes, as is shown in Figs. 14–18, a manually engageable button 43 which is moved downwardly by the operator, this button being connected through a suitable element to an elongated rod 269 which is guided within the housing of the camera for longitudinal shifting movement. The bottom end 284 of the rod 269 is of a conical configuration, and as may be seen by reference to Fig. 1 this bottom end 284 is in engagement with a free edge of the plate 285. Thus, when the shutter release means 43, 269 is actuated so as to move the rod 269 downwardly, the conical end 284 thereof will engage the plate 285 so as to turn the catch member 277 from the position thereof shown in Fig. 1 to the position thereof shown in Fig. 2, and this movement will cause the projections of both of the catch members to move away from the teeth of the toothed members 295 and 305, so that upon release of the shutter both the discs 279 and 276 may be turned.

Thus, after an exposure has been made the operator has the choice of actuating the film transporting structure so as to move the next film frame into a picture-taking position or of actuating the lock structure so as to open the camera to remove the magazine therefrom. Whichever one of these structures the operator decides to operate, after this one structure has started to operate the other structure cannot operate for the reasons pointed out above.

Figures 10, 11:
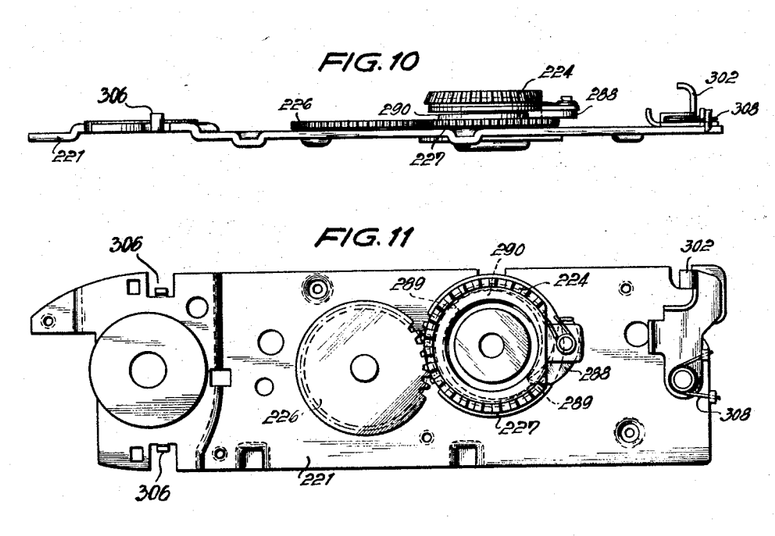
Fig. 10 is a side elevational view of a bottom wall of the camera with part of the film transporting structure carried thereby as well as with part of the double exposure preventing structure of the camera of the invention.
Fig. 11 is a plan view of the structure of Fig. 10.
Figure 12:
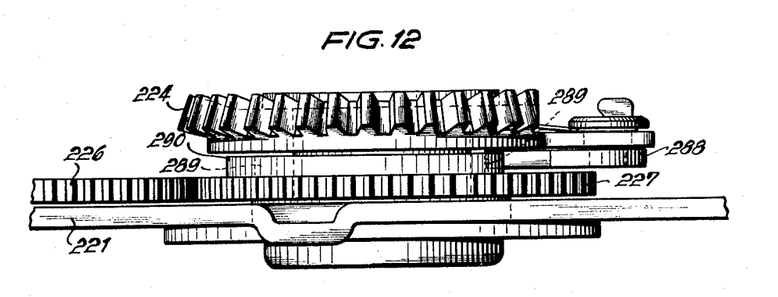
Fig. 12 shows part of the film transporting structure of Fig. 10 on an enlarged scale.

As is indicated in Figs. 10 and 11, the plate 221 carries for pivotal movement an element 302 which forms part of the double exposure prevention structure. This element 302 is urged by the spring 308 to turn in a direction which will cause a portion of the element 302 to enter into a notch 307 of the rod 269 when the shutter release means is released by the operator. A spring 271

(Figs. 14–18), which is a leaf spring, engages the shutter release so as to urge the latter upwardly to its rest position, and when the notch 307 of the rod 269 becomes aligned with a portion of the element 302, the spring 308 urges the latter into the notch 307 so that in this way the shutter release means cannot again be depressed and a double exposure is prevented.

Figure 2:
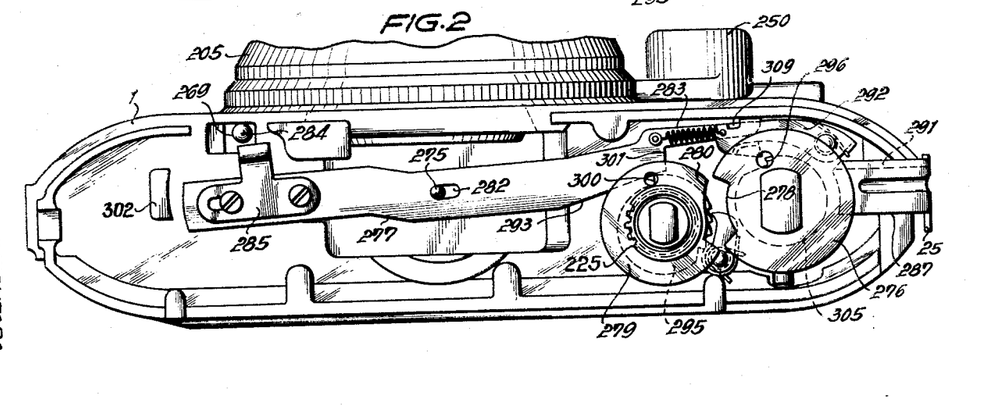
Fig. 2 is a view similar to Fig. 1 showing the parts, which are shown in Fig. 1 in a blocking position, in Fig. 2 in an unblocking position.
Figure 3:
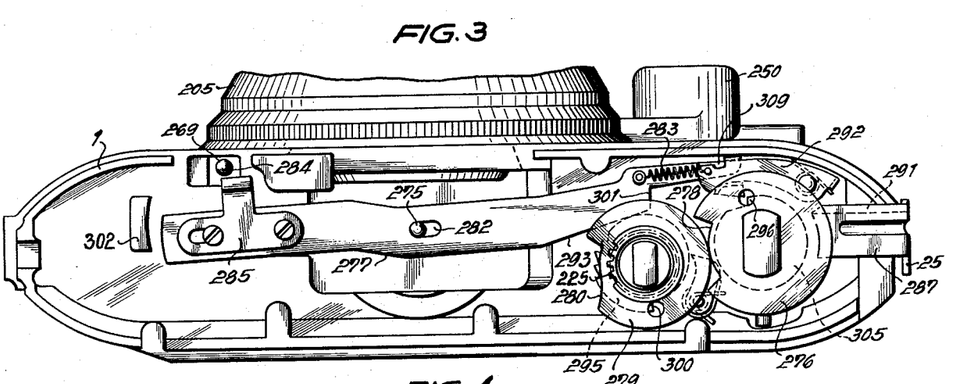
Fig. 3 shows the structure of Fig. 1 after a disc which forms part of a film transporting means has been turned through 180°.
Figure 4:
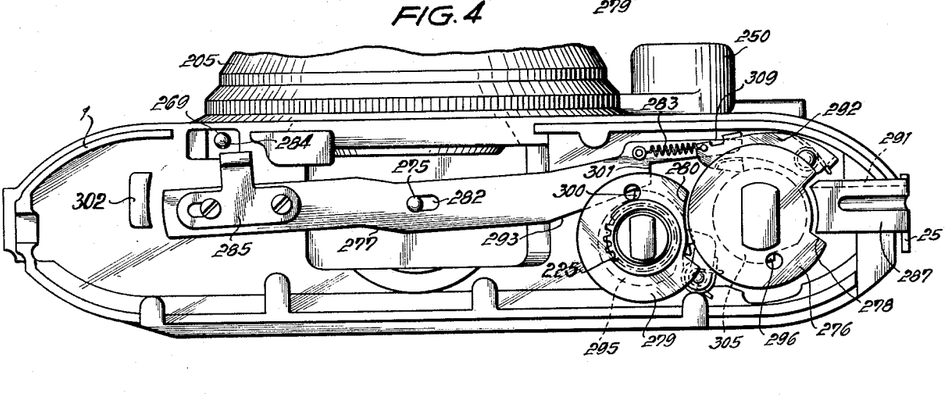
Fig. 4 shows the structure of Fig. 1 after a disc which forms part of a camera locking means has been turned through 180°.

It will be noted from a comparison of Figs. 1 and 2 that when the rod 269 has moved down so as to turn the catch member 277 from its position of Fig. 1 to that of Fig. 2, as soon as the projection 301 has moved beyond the tooth 300 the spring 283 acts to shift the catch member 277 to the right, as viewed in Fig. 2, so as to locate the left end of the slot 282 against the pivot pin 275. As a result the projection 301 of the lever 277 is no longer in alignment with the tooth 300 of the tooth member 295, and thus the catch member 277 cannot now prevent turning of the disc 279 together with the remainder of the film transporting means, and of course the disc 276 can also be turned at this time, as was pointed out above. During actuation of the film transporting means the outer periphery 294 of the tooth member 295 rides along the edge 293 of the catch member 277, and as the tooth member 295 approaches the end of its turning movement the spring 283 will cause the projection 301 of catch member 277 to move into the path of movement of the tooth 300 of the tooth member 295. Fig. 3 shows the structure after this tooth member as well as the disc 279 have turned through 180°. Fig. 4 shows the structure after the disc 276 has been turned through 180°.

Thus, as the tooth member 295 approaches the end of its turning movement the tooth 300 thereof will engage the projection 301 of the catch member 277 and will shift the catch member to the left, as viewed in Fig. 1, back to the position of Fig. 1, and because of the engagement of the pivot pin 275 with the right end of the slot 282, it will not be possible to turn the film transporting means any more, so that this structure determines the extent to which the film can be transported, and the parts are designed so that a single film frame has now been located in its picture-taking position. Furthermore, upon shifting of the catch member 277 from the position of Fig. 2 to that of Fig. 1, this catch member engages the element 302 shown in Figs. 10 and 11 so as to turn the latter against the force of the spring 308 in a direction which moves the element 302 out of the notch 307 of the rod 269, and thus at this time with the parts again in the position shown in Fig. 1 the shutter release is again free to be actuated.

Figure 19:
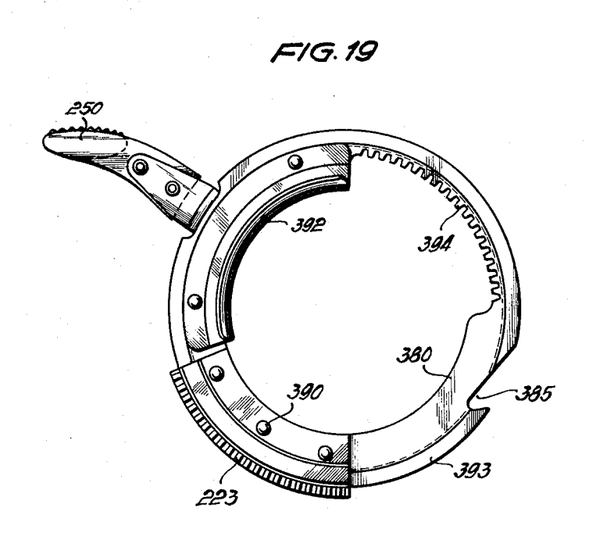
Fig. 19 is an elevational view of the manually turnable ring means of the invention shown by itself.

Figs. 10–13 show the gears 226 and 227 carried by the plate 221 and forming part of the film transporting structure, as has been pointed out above. A bevel gear 224 is located above the gear 227, and this bevel gear carries a spring urged pawl member 288, this pawl member being urged by its spring inwardly toward the axis of turning of the bevel gear 224. The pawl member 288 cooperates with a tooth 289 of a toothed member 290 which is connected to the gear 227 for rotation therewith, the bevel gear 224 being freely turnable with respect to the tooth member 290 as well as the gear 227. Fig. 19 shows by itself a ring means in the form of a ring member 380 which has fixed thereto a gear sector 223 which forms part of a bevel gear and which meshes with the bevel gear 224 so that when the ring means is turned the bevel gear 224 will turn.

Figure 18:
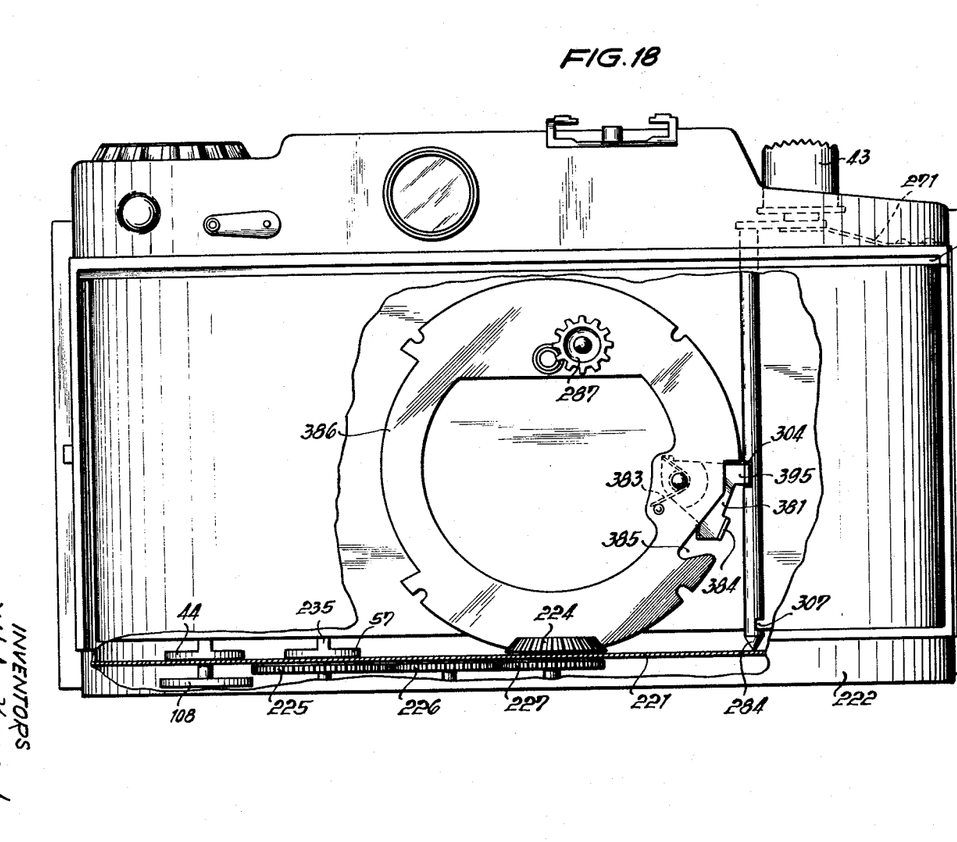
Fig. 18 shows the structure located in front of the manually turnable ring means of Fig. 15.

This ring means is supported for turning movement by suitable structure of the camera housing, this structure including the plate 386 shown in Fig. 18, this plate being located at the rear end of the objective assembly. As may be seen from Fig. 19 the ring means 380 includes in addition to the manually operable lever portion 250 which is engaged by the operator and in addition to the gear sector 223 an arcuate guide 392 which is fixed to the ring 380 as well as inner teeth 394 located at the inner periphery of the ring and the outer periphery 393 of the ring is interrupted by a notch 385 for a purpose described below.

Figure 15:
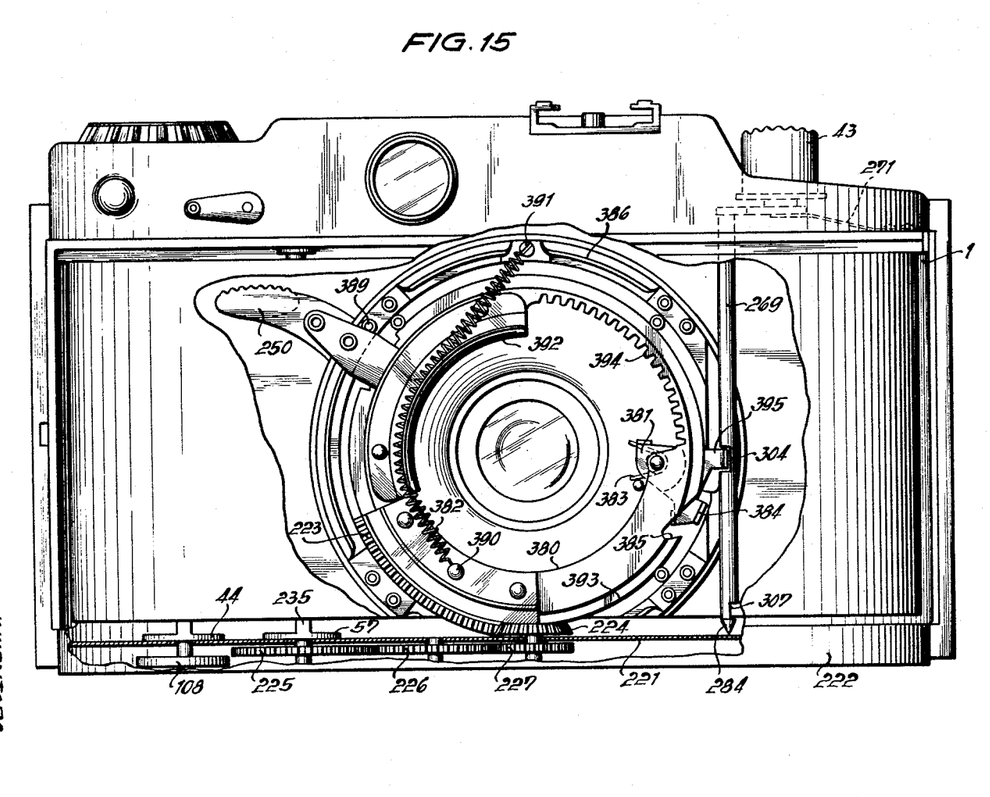
Fig. 15 is also a view from the rear with walls broken away of the camera of the invention, Fig. 15 showing the structure for actuating the film transporting means as well as cocking the shutter in a rest position.
Figure 16:
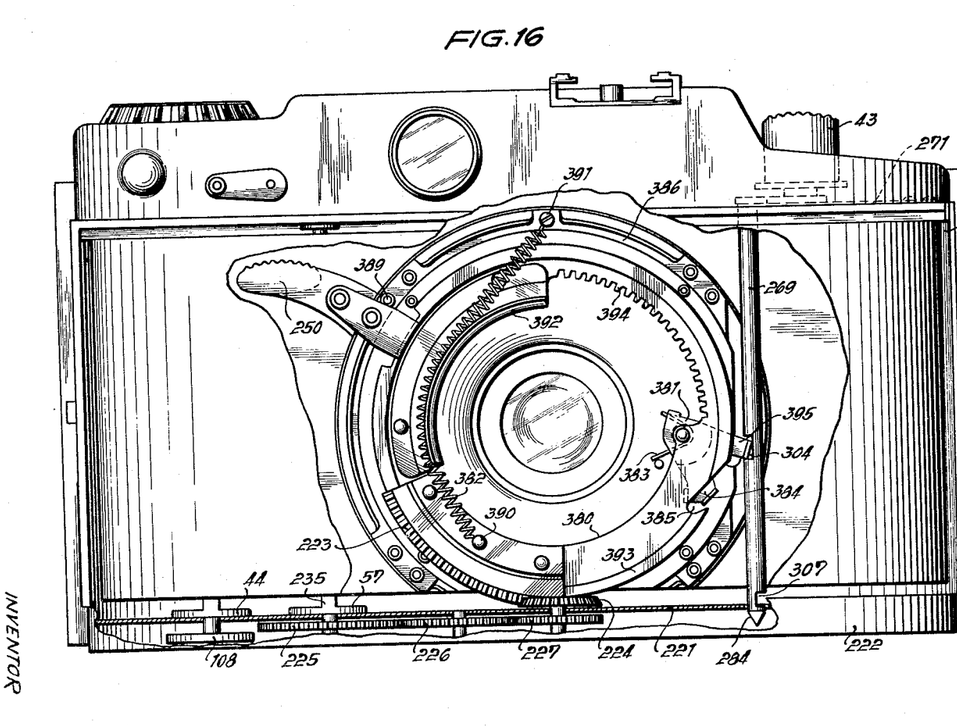
Fig. 16 shows the position which the parts of Fig. 15 take after the shutter release means has been actuated.
Figure 17:
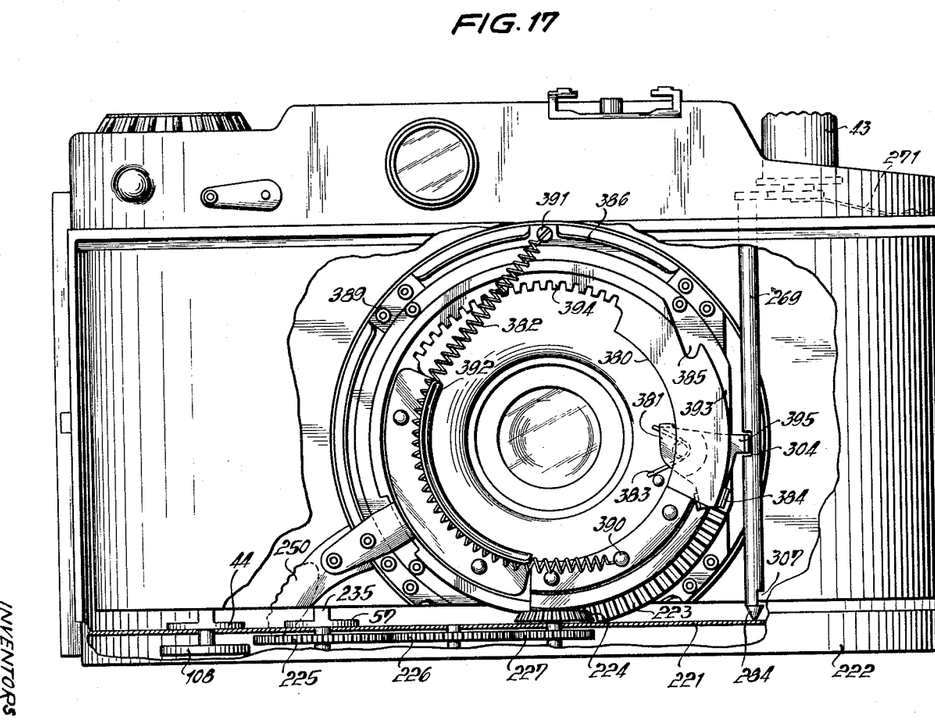
Fig. 17 shows the position which the parts of Fig. 15 take after a manually turnable ring means has been turned by the operator in order to actuate the film transporting means and a shutter cocking means.

As is apparent from Figs. 14–17 the ring means 380 is turnable about the optical axis 480 of the objective 197 (Figs. 15–17). When the lever 250 is actuated so as to turn the ring means from the starting position thereof shown in Figs. 14 and 15 to the end position thereof shown in Fig. 17 the gear sector 223 meshes with the bevel gear 224 so as to turn the latter in a direction which actuates the film transporting means to transport the next unexposed film frame into a picture-taking position. A spring 382 is connected at one end to a pin 390 fixed to the ring 380 and at its opposite end to a stationary pin 391 which is fixed to the plate 386 of Fig. 18, so as to urge the ring back to its starting position indicated in Figs. 14–16, and the plate 386 of Fig. 18 carries stop pins 389 which cooperate with the lever means 250 for determining the starting position of the ring means 380. The guide 392 serves to guide the coil spring 382 so that it is maintained by the guide 392 at all times out of the path of light rays which are moving through the objective.

Figure 13:
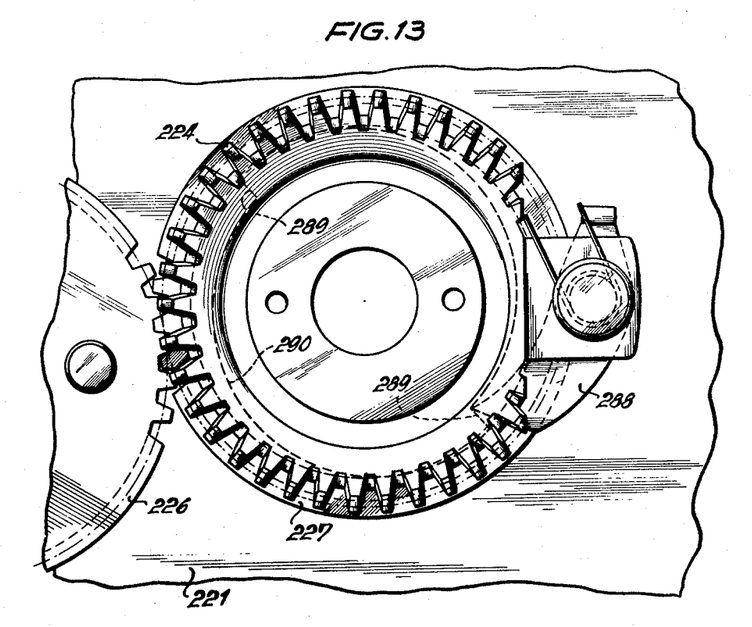
Fig. 13 is a top plan view of the structure of Fig. 12.

As is apparent from Fig. 13 upon turning of the bevel gear 224 the pawl 288 will engage the tooth 289 so as to turn the gear 227 and the remainder of the film transporting structure. If the operator should turn the lever 250 through only part of its complete stroke and then should release the lever it will automatically return to its starting position under the action of the spring 382, and then the operator may again move the lever 250 until the pawl 288 engages the tooth 289. Thus, with the structure of the invention the operator can turn the lever 250 back and forth as many times as desired between its starting position and its end position shown in Fig. 17 and nothing will happen with respect to the operation of the camera. Once the lever 250 has been turned through the entire stroke which brings about a full revolution of the gear 225, the cooperation of the tooth 300 with the projection 301 of catch member 277 will prevent further turning of the film transport means, as was pointed out above, and upon release of the lever 250 the spring 382 will return the spring means to its starting position where the pawl 288 again snaps behind the tooth 289, and thus the operator cannot again depress the lever 250 at this time.

As may be seen by reference to Fig. 18, the plate 386 carries a gear train 387 which forms part of a known structure for cocking the shutter which is part of the objective assembly. The inner teeth 394 of the ring 380 mesh with the gear 387 so that during the turning of the ring means 380 in order to transport the film the gear 387 is simultaneously turned by meshing with the teeth 394 of the ring 380 so as to cock the shutter. Thus, the manipulation of the lever 250 causes the film to be transported and the shutter to be simultaneously cocked.

As may also be seen from Fig. 18, a lever 381 is pivotally carried by the plate 386, and this lever 381 has an extension 395 extending into a second notch 304 of the rod 269 and a second extension 384 which is located next to the outer periphery of the ring 380, as is clearly apparent from Figs. 15–17. The spring 383 acts through the extension 395 and the notch 304 to cooperate with the spring 271 for returning the shutter release means to its starting position. It will be noted particularly from Fig. 17 that the extension 384 of the lever 381 is located so close to the periphery 393 of the ring 380 that if the button 43 is depressed while the notch 385 is out of the path of movement of the extension 384, then this extension will simply engage the outer periphery of the ring 380 and it will not be possible to depress the button 43 and the rod 269. Thus, these parts can be actuated only when the notch 385 is in the path of movement of the extension 384, as is indicated in Figs. 15 and 16. It will be noted that in Fig. 16 the button 43 and rod 269 are shown in their depressed position where the extension 384 has moved into the notch 385. Thus, any time the lever 250 is away from its starting position the shutter release means cannot be actuated, and thus, only after the film transporting means has been actuated and the lever 250 returned to its starting position can the shutter release be actuated. It should be noted that until the film transport means has been actuated to locate a complete unexposed frame in a picture-taking position it is not possible to depress the rod 269 because the element 302 is in the notch 307 thereof. It is only at the end of the film transporting movement that the catch member 277 shown in Figs. 1–4 is shifted back to the position of Fig. 1 to move elements 302 in a position where it releases the rod 269, as was described above.

A part of the outer surface of the tube which forms the housing of the objective assembly forms a bearing surface for the ring 380.

The operation of the above-described structure is believed to be clear from the description give above. It is apparent that the disc 276 can be turned by the key 108 only when an exposure has been made and the disc 279 is in the position shown in Figs. 1 and 2, and thus the camera cannot be opened at any undesired time. Moreover, it is not possible to make a double exposure and the structure of the invention guarantees that only a single film frame is transported to a picture-taking position irrespective of how the camera is operated. The shutter release cannot be actuated until another film frame is in a picture-taking position not only because of the cooperation of element 302 with the notch 307 but also because of the cooperation of extension 384 of lever 381 with the ring 380.

It will be understood that each of the elements described above, or two or more together, may also find a useful application in other types of cameras differing from the types described above.

While the invention has been illustrated and described as embodied in cameras with exchangeable magazines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera housing having a wall movable with respect to the remainder of said camera housing between an open position opening the interior of the camera housing so that a magazine may be placed into or removed from the camera housing and a closed position closing the camera housing so as to retain a magazine therein; a pair of discs supported by said camera housing for turning movement about parallel axes, said discs being located beside each other in a common plane and one of said discs forming part of a lock means for releasably holding said wall in its closed position and the other of said discs forming part of a film transporting means for transporting the film of a magazine in said housing, said discs being respectively formed at their peripheries with cutouts and the peripheries of said discs being located next to each other so that when said discs are respectively in starting positions where their cutouts are directed toward each other only one of said discs may be turned through the cutout of the other disc while the latter disc is prevented from turning, whereby during actuation of the film transporting means the lock means cannot be actuated and during actuation of the lock means the film transporting means cannot be actuated.

2. In a camera, in combination, a camera housing having a wall movable with respect to the remainder of said camera housing between an open position opening the interior of the camera housing so that a magazine may be placed into or removed from the camera housing and a closed position closing the camera housing so as to retain a magazine therein; a pair of discs supported by said camera housing for turning movement about parallel axes, said discs being located beside each other in a common plane and one of said discs forming part of a lock means for releasably holding said wall in its closed position and the other of said discs forming part of a film transporting means for transporting the film of a magazine in said housing, said discs being respectively formed at their peripheries with cutouts and the peripheries of said discs being located next to each other so that when said discs are respectively in starting positions where their cutouts are directed toward each other only one of said discs may be turned through the cutout of the other disc while the latter disc is prevented from turning, whereby during actuation of the film transporting means the lock means cannot be actuated and during actuation of the lock means the film transporting means cannot be actuated, said lock means including a lock member shiftably carried by said housing for movement through the cutout of the disc which forms part of said lock means when the latter disc is in a predetermined angular position, whereby when said latter disc is in said angular position thereof and said lock member is in said cutout thereof neither of said discs can be turned, said lock means releasing said wall for movement to its open position when said lock member is in said cutout of said disc of said lock means.

3. In a camera, in combination, a camera housing having a wall movable with respect to the remainder of said camera housing between an open position opening the interior of the camera housing so that a magazine may be placed into or removed from the camera housing and a closed position closing the camera housing so as to retain a magazine therein; a pair of discs supported by said camera housing for turning movement about parallel axes, said discs being located beside each other in a common plane and one of said discs forming part of a lock means for releasably holding said wall in its closed position and the other of said discs forming part of a film transporting means for transporting the film of a magazine in said housing, said discs being respectively formed at their peripheries with cutouts and the peripheries of said discs being located next to each other so that when said discs are respectively in starting positions where their cutouts are directed toward each other only one of said discs may be turned through the cutout of the other disc while the latter disc is prevented from turning, whereby during actuation of the film transporting means the lock means cannot be actuated and during actuation of the lock means the film transporting means cannot be actuated; a pair of toothed members respectively fixed to said discs for turning movement therewith; a pair of catch members respectively having projections and movably supported by said housing for movement between catch positions where said projections of said catch members respectively engage teeth of said toothed members for preventing turning of said discs and release positions where said projections of said catch members are respectively spaced from said teeth of said toothed members to release said discs for turning movement; means interconnecting said catch members with each other for movement together between their catch and release positions; and shutter release means carried by said camera housing and cooperating with one of said catch members for acting on the same to move said one catch member together with the other catch member from their catch to their release positions upon actuation of said shutter release means to release a shutter of the camera when making an exposure, whereby said discs are prevented from turning until after an exposure is made.

4. In a camera, in combination, a camera housing having a wall movable with respect to the remainder of said camera housing between an open position opening the interior of the camera housing so that a magazine may be placed into or removed from the camera housing and a closed position closing the camera housing so as to retain a magazine therein; a pair of discs supported by said camera housing for turning movement about parallel axes, said discs being located beside each other in a common plane and one of said discs forming part of a lock means for releasably holding said wall in its closed position and the other of said discs forming part of a film transporting means for transporting the film of a magazine in said housing, said discs being respectively formed at their peripheries with cutouts and the peripheries of said discs being located next to each other so that when said discs are respectively in starting positions where their cutouts are directed toward each other only one of said discs may be turned through the cutout of the other disc while the latter disc is prevented from turning, whereby during actuation of the film transporting means the lock means cannot be actuated and during actuation of the lock means the film transporting means cannot be actuated; an elongated lock member located at the exterior of said camera housing and shiftably supported by the latter and forming part of said lock means, said lock member having an extension overlapping said disc which forms part of said lock means and located at a part of the latter disc which is diametrically opposed to the other disc, said extension having a configuration substantially corresponding to the cutout of said disc of said lock means so as to be capable of being located in said cutout when said disc has an angular position placing said cutout thereof in alignment with said extension of said lock member and said lock means being in a position releasing said wall for movement to its open position when said extension of said lock member is located in said cutout of said disc of said lock means.

References Cited in the file of this patent

UNITED STATES PATENTS

| | | |
|---|---|---|
| 1,527,476 | Gianetto | Feb. 24, 1925 |
| 2,104,094 | Nerwin | Jan. 4, 1938 |
| 2,233,006 | Gholdhammer | Feb. 25, 1941 |
| 2,257,424 | Meyer | Sept. 30, 1941 |
| 2,298,349 | Crumrine | Oct. 13, 1942 |
| 2,335,439 | Nerwin et al. | Nov. 30, 1943 |
| 2,344,409 | Kuppenbender et al. | Mar. 14, 1944 |
| 2,554,333 | Kaplowitz | May 22, 1951 |
| 2,577,160 | Simmon | Dec. 4, 1951 |
| 2,674,166 | Socher | Apr. 6, 1954 |
| 2,735,772 | Mihalyi | Feb. 21, 1956 |
| 2,738,716 | Faulhaber et al. | Mar. 20, 1956 |
| 2,813,470 | Meixner | Nov. 19, 1957 |

FOREIGN PATENTS

| | | |
|---|---|---|
| 472,563 | Great Britain | Sept. 27, 1937 |
| 474,260 | Great Britain | Oct. 28, 1937 |
| 834,548 | France | Oct. 22, 1938 |
| 900,980 | France | Oct. 23, 1944 |
| 933,275 | France | Dec. 17, 1947 |
| 844,704 | Germany | July 24, 1952 |